No. 701,773. Patented June 3, 1902.
R. STUBBS.
WATER HEATING APPARATUS.
(Application filed Jan. 15, 1902.)

(No Model.) 2 Sheets—Sheet 1.

Witnesses
Albert Popkins
Grace P. Brereton

Inventor
Reuben Stubbs
By Sturtevant & Cruhy
Attorneys

No. 701,773. Patented June 3, 1902.
R. STUBBS.
WATER HEATING APPARATUS.
(Application filed Jan. 15, 1902.)
(No Model.) 2 Sheets—Sheet 2.

Witnesses
Albert Popkins
Grace P. Brereton

Inventor
Reuben Stubbs
By Sturtevant & Huly
Attorneys

UNITED STATES PATENT OFFICE.

REUBEN STUBBS, OF WINSFORD, ENGLAND.

WATER-HEATING APPARATUS.

SPECIFICATION forming part of Letters Patent No. 701,773, dated June 3, 1902.

Application filed January 15, 1902. Serial No. 89,892. (No model.)

*To all whom it may concern:*

Be it known that I, REUBEN STUBBS, gentleman, residing in Winsford, in the county of Chester, England, (whose full postal address is Fern Villa, Winsford,) have invented certain new and useful Improvements in Water-Heating Apparatus, of which the following is a specification, and for which provisional protection has been applied for in England, No. 16,775, dated August 21, 1901.

This invention relates to a compound system of water-heating apparatus for hot-houses, public buildings, and other purposes, and has mainly for its object to economize fuel and labor.

The invention will be understood from the following description, reference being had to the accompanying drawings, in which—

Figure 1:
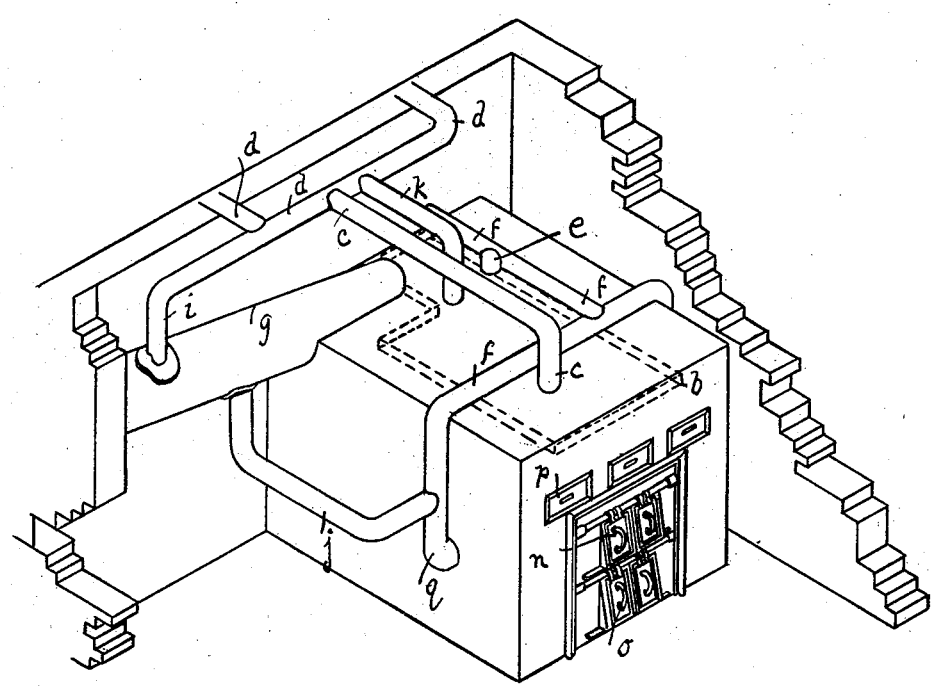
Figure 2:
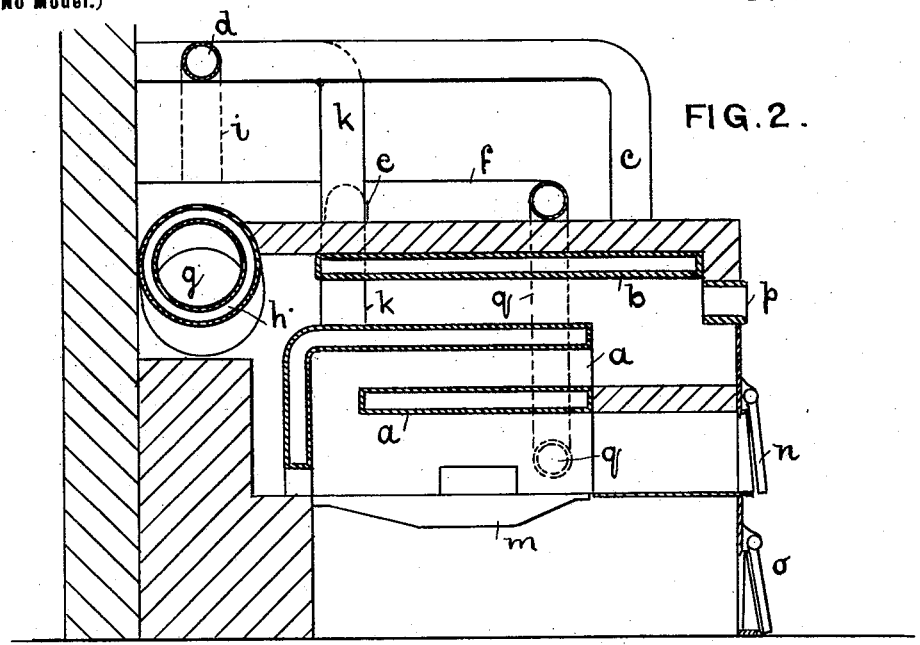
Figure 3:
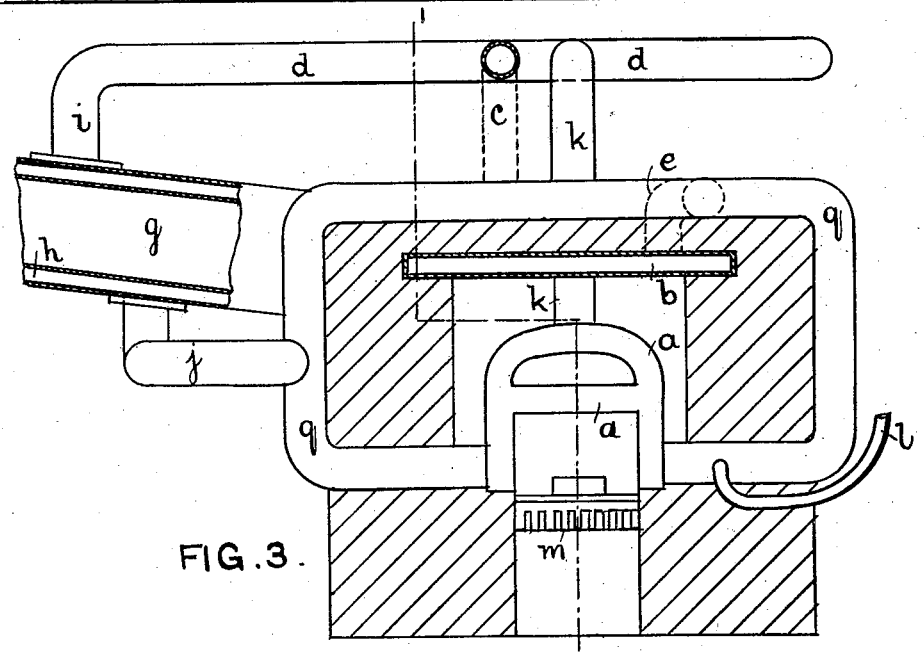

Figure 1 is a general view of a water-heating apparatus supplied with my invention; Fig. 2, a longitudinal section on the line 1 2; Fig. 3, a transverse section.

Referring to the figures, $a$ is an ordinary boiler of the horizontal or saddle type. Above this boiler—say four inches—against the top of the brickwork of the furnace, is a hollow metallic chamber $b$, containing water. This is connected by a pipe $c$ with the main flow $d$, that leads to the heat-radiating appliance, and by another pipe $e$ with the return $f$, and it is directly located in the path of the furnace-gases after they have acted upon the boiler $a$, thus absorbing a considerable amount of heat which would otherwise pass up the chimney. The gases impinge against this chamber $b$ instead of, as hitherto, against a brick arch. I thus considerably increase the heating-surface and extract a much larger quantity of heat from a given quantity of fuel, making the best possible use of the heat which is usually wasted on the brickwork. I also provide a metallic flue $g$, sloping upward and leading the furnace-gases, after they have acted upon the boiler and chamber $b$, to the chimney. This flue $g$ has a water-jacket $h$, and the hot gases passing through it strike upward against the interior of the flue, and thus heat the water contained therein. The water-jacket of this flue is also connected by a pipe $i$ with the main flow $d$ and by another pipe $j$ with the return $f$.

$k$ is a pipe leading hot water from the boiler $a$ to the main flow-pipe $d$; $l$, the cold-water-feed pipe; $m$, fire-bars; $n$, fire-doors; $o$, ash-pit doors; $p$, soot-doors, and $q$ return-pipe leading water to boiler to be reheated.

The mode of action is as follows: The hot furnace-gases after acting upon the boiler $a$ impinge directly against the auxiliary water-chamber $b$, thus heating the water therein, and afterward pass through the water-jacketed flue $g$, thus also heating the water in the jacket, and finally pass into the chimney with a far greater amount of heat extracted than has hitherto been customary. It is found by this arrangement very considerably less fuel will be required to heat a given supply of water.

I declare that what I claim is—

A water-heating apparatus comprising the boiler, and its fire-box, a hollow metallic water-chamber extending horizontally above the boiler in the path of the products of combustion, an offtake or main flow-pipe leading from the boiler, a pipe connecting the said water-chamber with said main flow-pipe, a return flow-pipe leading to the boiler, a pipe connecting the said water-chamber with said return flow-pipe, a smoke-flue leading from the fire-box, a water-jacket surrounding the said flue, a pipe connecting said water-jacket with said main flow-pipe, and a second pipe connecting said water-jacket with said return flow-pipe; substantially as described.

In witness whereof I have hereunto signed my name, this 18th day of December, 1901, in the presence of two subscribing witnesses.

REUBEN STUBBS.

Witnesses:
  G. C. DYMOND,
  F. P. EVANS.